May 26, 1970  A. R. CHAMBERLIN  3,513,621
METHOD AND APPARATUS FOR AUTOMATICALLY OPENING, FILLING
AND CLOSING RECEPTACLES WITH TELESCOPING COVERS
Filed Aug. 31, 1967  3 Sheets-Sheet 1
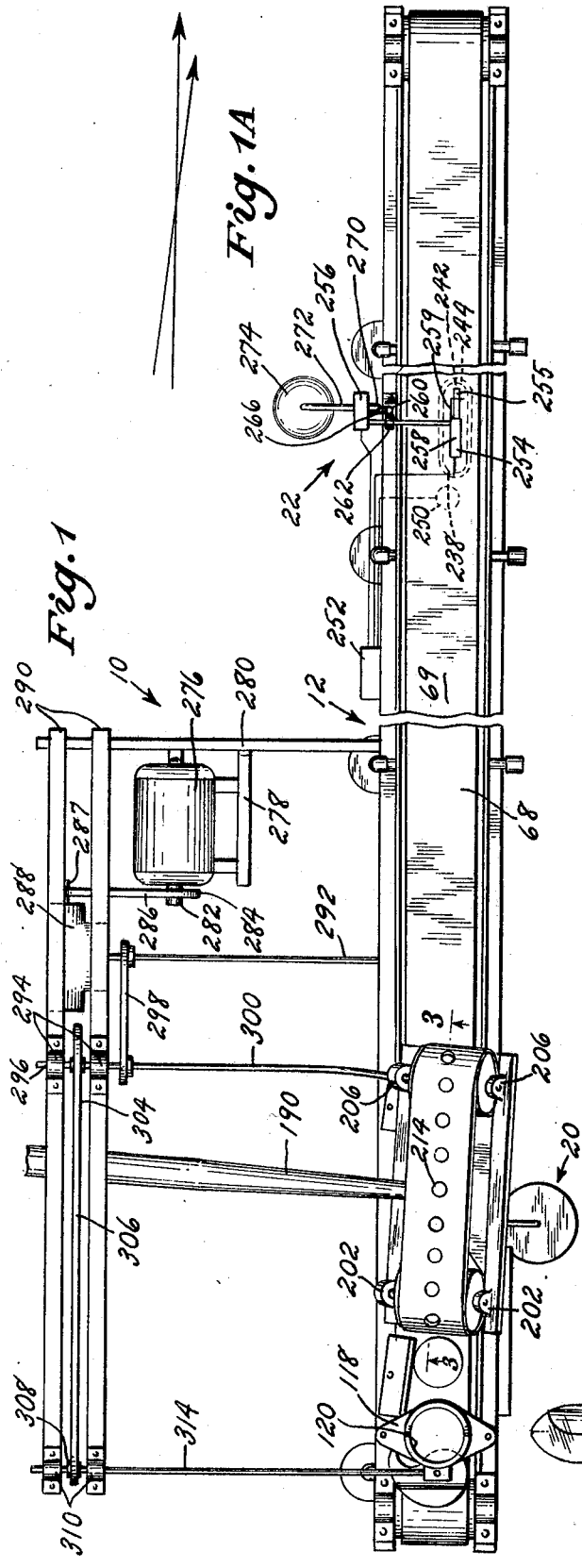
Fig. 1
Fig. 1A
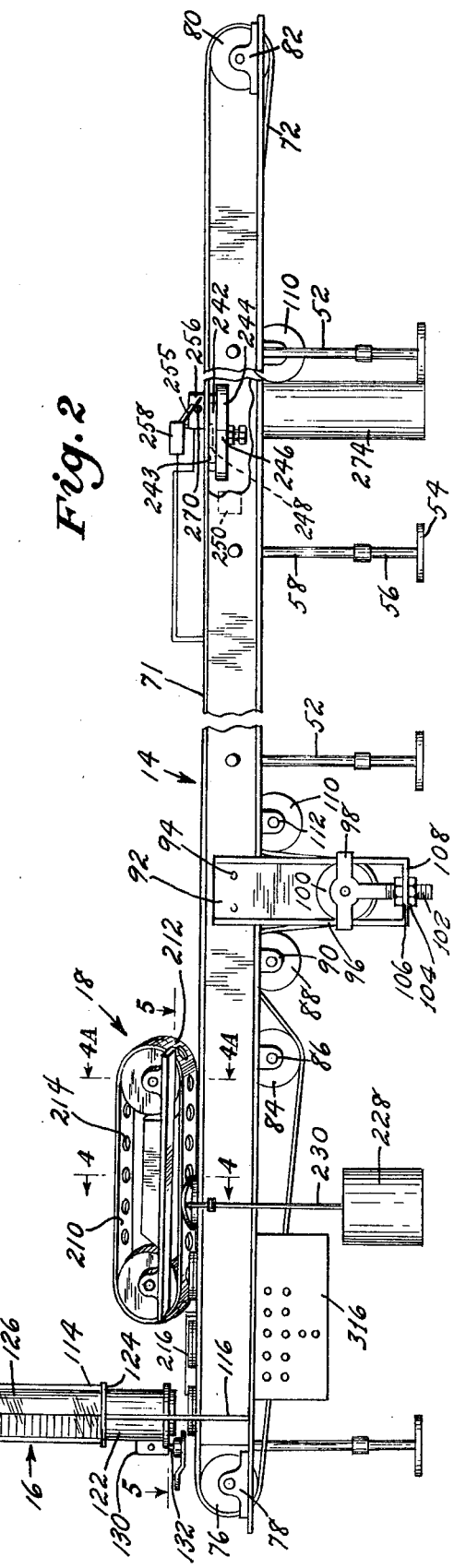
Fig. 2

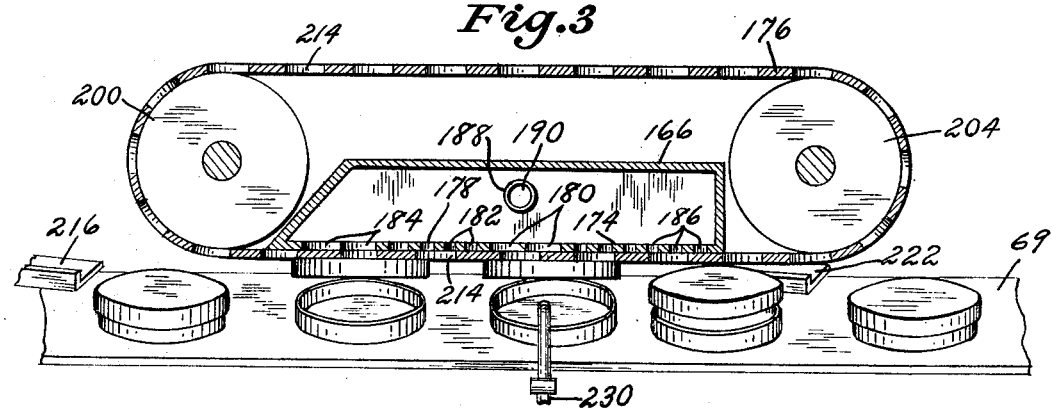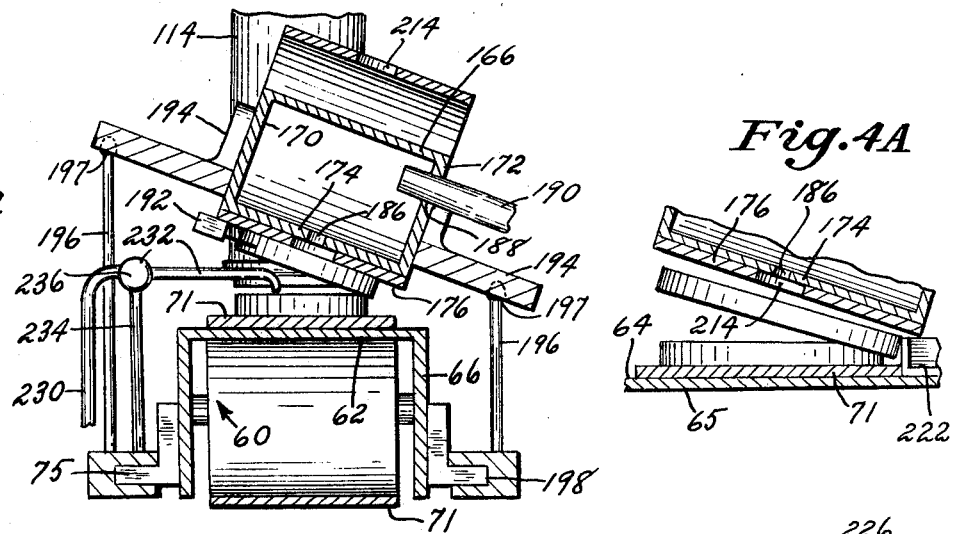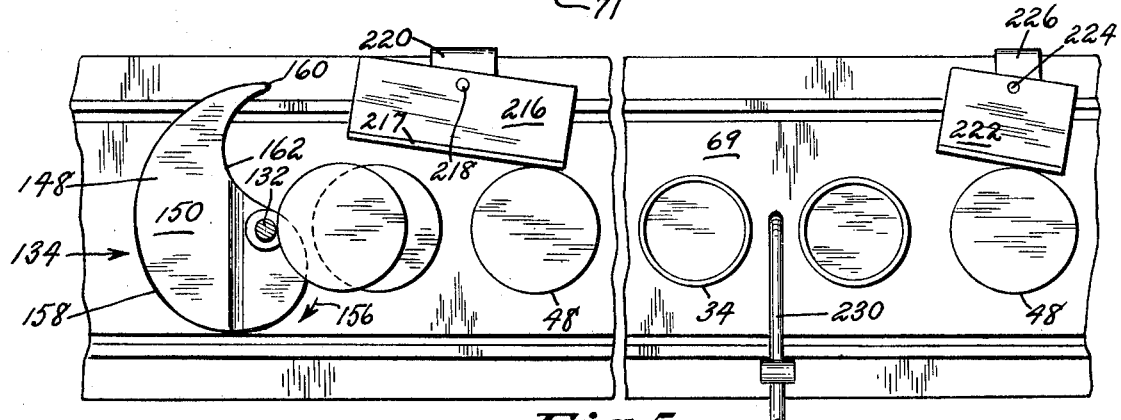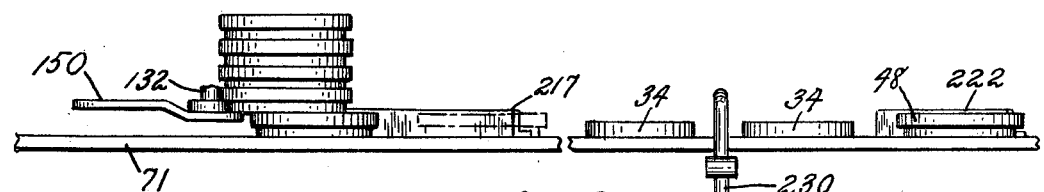

United States Patent Office 3,513,621
Patented May 26, 1970

3,513,621
METHOD AND APPARATUS FOR AUTOMATICALLY OPENING, FILLING AND CLOSING RECEPTACLES WITH TELESCOPING COVERS
Alexander R. Chamberlin, Bloomsburg, Pa., assignor to Microbiological Instruments, Inc., Yonkers, N.Y., a corporation of New York
Filed Aug. 31, 1967, Ser. No. 664,762
Int. Cl. B65b 3/04
U.S. Cl. 53—37           21 Claims

ABSTRACT OF THE DISCLOSURE

An automatic dish filling machine including dispensing means, conveyance means, independent cover removal, retaining, and replacement means, independently actuated filling means, and malfunction rejection means. The dispensing means places two-part dishes onto the conveyance means. A suction means removes and retains covers of the dishes off the bases for a predetermined period, during which sensing of the presence of the cover actuates the filling means. Upon removal of the suction, the cover is released and is pivotally cammed back on the base. The malfunction rejection means then senses if the proper quantity of media has been placed in the dish, and if the cover has properly reengaged the base.

BACKGROUND OF PRIOR ART

This invention relates to automatic dish filling machines and more particularly to a machine for automatically injecting a desired quantity of media into a two part unit, such as a Petri dish composed of a standard cylindrical base and telescoping cover.

Previous attempts to build a machine for automatically filling objects, such as the Petri dishes mentioned above, have resulted in cumbersome and complex machines with all the attendant difficulties and problems created by an involved piece of machinery; or relatively simply constructed machines, which in actual practice do not perform as intended.

After dispensing the two part unit into such machines, it is necessary to maintain proper spacing between the units at all times. Cover removal and replacement is also accomplished by equally complicated mechanical apparatus, and the requirement for the maintenance of spacing between, at least, the bases is always present. The filling mechanism of such machines injects media into the bases, operating on continuous cycles. The cycling of the filling mechanism is intrically connected with the other operational elements of such of these machines, and hence the necessity of spacing between the bases, to insure that the bases are in proper position to receive the media as it ejected from the fill needle.

None of the machines disclose any way of determining if the filling and subsequent closure operations have been performed properly, thus necessitating a manual visual inspection after exit from such machines.

Accordingly, it is among the principal objects of the present invention to provide a single cycle filling means actuated by the cover of a dish after it has been removed from the base, thus eliminating the necessity for precise alignment of the unit prior to its location in proximity with the filling means.

Another object of the present invention is to provide an improved dispensing means comprising a single moving part which meters the rate of flow of the dishes, imparts an initial linear motion to each dish, and raises the succeeding stack of dishes off the dish just dispensed.

Still another object of the present invention is to provide a cover removal, retaining, and replacement means which will remove a cover from a base of a dish prior to actuation of the filling means, and including means to realign the cover and base while the cover is retained off the base to insure proper replacement of the cover on the base that has been released.

Yet a further object of the present invention is to provide a machine of the character described in which no person is near the dish while the dish is opened for filling, increasing the sterility of the process.

Still a further object of the present invention is to provide an improved automatic dish filling machine.

Still a further object of the present invention is to provide automatic sensing means to ascertain if the proper quantity of media has been placed in the base and if the cover has been properly replaced on the base.

SUMMARY OF INVENTION

The machine comprises a frame upon which are mounted a conveyor; a dispenser for placing dishes on the conveyor; means to remove the cover from the dish and maintain it in a removed position, during which independently actuated filling means places a predetermined quantity of media in the base of the dish; and means to replace the cover on the dish.

The conveyor consists of an ordinary belt conveyor over which is mounted a dispenser near the filling end of the conveyor. The dispenser includes a tubular magazine sized to receive the desired diameter of Petri dish. The lower opening of the magazine has positioned thereunder a stepped volute cam. This cam meters the flow of dishes from the magazine to the conveyor belt, imparts a linear forward motion to the dish just placed on the belt, and raises the succeeding dishes in the magazine to enable free travel of the dish on the belt.

The dish moves on the conveyor belt under the cover removal, retaining, and replacement means which comprises an oppositely disposed perforated belt which is acutely angled and yawed with respect to the conveyor belt. Placed longitudinally within the perforated belt and contacting the bottom side thereof is a perforated box maintained at a minus pressure by suction means. When the dish and a perforation in the belt line up with an opening in the suction box, the cover of the dish is raised from the dish and is retained against the bottom side of the belt. During the removal operation the pivotal raising of the cover will cause the base to be moved laterally on the main conveyor belt. Because of the yawed positioning of the upper belt, the cover gradually moves back into registry with the base.

As the cover moves with the belt the side of the cover contacts and trips a snap switch. This cycles the filling mechanism, injecting a pre-determined quantity of media into the base of the dish.

After the dish has been filled, the base and the cover travel to the end of the suction box, where the holes in the box are no longer aligned with the perforations in the belt. The cover is then released from the vacuum, and being positioned back in registry with the base, drops back into place on the base.

The dishes continue moving down the main conveyor belt to the malfunction rejection means. This means consists of a sensing device to determine if the proper quantity of media has been placed in the base, and a trip switch to sense if the cover is properly engaging the base.

Additional objects and advantages of the invention will become apparent during the course of the following specification when taken in connection with the accompanying drawings, in which:

FIG. 1 is a top plan view of an automatic dish filling machine embodying the invention, with two portions of the main conveyance means cut away.

FIG. 1A is a schematic view showing the relationship between the principal axes of the conveyance means and the cover removal, retaining, and replacement means.

FIG. 2 is a side elevational view of the machine, with two portions of the main conveyance means cut away and with the snap switch of the filling means and the covers of the dishes removed.

FIG. 3 is a cross-sectional view taken along the line 3—3 in FIG. 1, with the dishes, the fill needle, and the conveyance means shown in full perspective.

FIG. 4 is a cross-sectional view taken along line 4—4 in FIG. 2 with an elevational view of a dish, the cover and base being maintained in an open position and receiving media from the fill needle.

FIG. 2A is an enlarged cross-sectional view showing the cover just after release from the suction box, engaging the bumper plate and being pivoted into closing engagement with the base.

FIG. 5 is an enlarged plan view taken along the line 5—5 in FIG. 2 with a portion of the conveyance means removed.

FIG. 6 is a side elevational view of FIG. 5.

Figure 7:
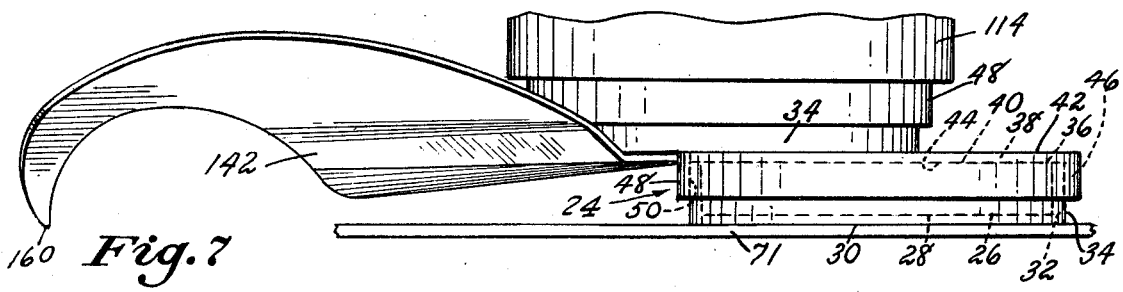
FIG. 7 is a greatly enlarged, side elevational view of the dispensing cam, imparting a linear motion to the dish on the main conveyance means while the lower portion of the cam begins to raise the stack of dishes in the magazine.

Referring in detail to the drawings, the automatic dish filling machine made in accordance with the present invention is shown as generally comprising a frame 12 upon which are mounted conveyance means 14, dispensing means 16, cover removal, retaining, and replacement means 18, independently actuated filling means 20, and malfunction rejection means 22.

Before turning to a specific description of the machine it should be noted that said machine may be used with any dish unit in which the cover is telescopically mounted over the base, the fit between the two being such that the top removal, retaining, and replacement means can lift the cover off the base. For purposes of the present description, the unit to which the present machine will be directed will be the standard Petri dish, being of a 100 millimeter diameter and of any convenient height. While the machine generally utilizes plastic dishes, it is also possible to utilize glass dishes without any breakage problem.

The standard Petri dish 24 includes a base 26 having a bottom wall 28 with a bottom surface 30, and a side wall 32 with an outer surface 34 and an upper edge 36. Telescopically engaging the base is a cover 38 having a top wall 40 with an upper surface 42 and a lower surface 44. Depending from the top wall is a side wall 46 having an outer surface 48 and an inner surface 50.

Turning to FIGS. 1 and 2 there is shown that portion of the frame 12 which supports the elements of the machine, and which comprises a plurality of pairs of adjustable leveling jacks 52. The jacks include a cylindrical plate 54 which is secured to an outer threaded first shaft member 56 which in turn is received within an inner threaded second shaft member 58. The second shaft member is L-shaped and a pair of jacks receive a bar 59 which supports the conveyance means 14 as hereinafter described.

The conveyance means includes a bed channel 60 (FIG. 4) defined by an upper wall or deck 62 having an upper surface 64, a lower surface 65, and side walls 66. The side walls have openings 67 to receive the bar 59. The channel may be divided into sections for convenience of assembly and dismantling.

By rotating the first shaft member 56 within the second shaft member 58 the heights of the jacks 52 may be varied to compensate for unevenness of the reference surface upon which the elements rest so that the upper surface 54 of the conveyance means may be leveled both in an axial and lateral direction.

The length of the bed channel is sufficient to allow the liquid media to congeal within the Petri dishes before reaching the end of the forward travel of the conveyance means. A practical length has been found to be approximately 30 feet. The lateral width of the channel is approximately 6 inches, allowing for use of Petri dishes of up to 100 millimeters in diameter. It is understood that the length and width will vary with the size of the dish, ambient temperature, and production desired.

Placed in engagement with the channel 60 is a conveyor belt 68 defined by an upper surface 69 and a lower surface 70. The carrying side 71 lies on the upper surface 64 of the channel, and the bottom or return side 72 is generally positioned between the side wall 66, as will be described more fully hereafter.

Two angle irons 74 are secured to the side walls 66 of the bed channel 60 aproximate to the lower portion thereof. The angle irons may be secured to the box by any convenient means, such as bolts as shown in FIG. 4, and the horizontal shoulder 75 of the iron is parallel to the upper wall 62 of the channel. The angle irons extend outwardly beyond both ends of the bed channel. The angle irons may be considered as part of the frame, and act as couplings to couple the sections of the channels together and as a mounting for the various unit mounting clamps. A left end idler tail pulley 76 is supported on the iron by means of pillow blocks 78 which are secured to the iron. The pulley is positioned so that the outer surface meets the belt just below the channel. In a similar manner a right end idler head pulley 80 is supported by pillow blocks 82 mounted on the angle irons at the right end of the bed channel.

Mounted beneath the channel is a wrap pulley 84 journaled in pillow blocks 86 which are secured to the angle iron 74. The belt passes outwardly of the pulley channel and is then directed inwardly to a driver pulley 88 journaled in pillow blocks 90, which are also secured to the angle iron 74. The means for powering the driver pulley 88 will be described hereafter.

Mounted next to the driver pulley is a take-up frame 92, secured to the side wall 76 by bolts 94. Slideably mounted on the vertical struts 96 of the frame is a take-up bearing 98 to which is journaled a pulley 100. The take-up bolt 102 of bearing 98 is threaded and is received within a take-up nut 104 rotatably secured within a bore 106 in a plate 108 of the frame 92. The belt passes outwardly on the pulley 100 with respect to the channel 60 and then passes inwardly of return pulley 110 journaled in pillow blocks 112 from whence it communicates with right end idler head pulley 80.

By adjustment of the bearing 98 the slack within the belt may be varied. The bearing 90 and 112 may be easily removed from the angle iron 74, allowing simplified rapid replacement of the belt. The belt, which is preferably composed of an autoclavable nylon, must be sterile during opertaion. The rapid changeover of the belt is necessary if either of the belts is no longer in a substantially sterile condition. The inner surface 70 of the belt is in contact with the upper surface 64 of the upper wall 62 of the bed channel 60.

The dispensing means 16 is located at the left or loading end of the conveyance means and includes a magazine 114 supported by adjustable support posts 116 which are mounted on the angle irons 74 and which are inserted in a suitable plate 118 having an opening 120 sized to receive and maintain the magazine in position above the surface of the belt.

The magazine 114 consists of two sections, a lower cylindrical section whose upper portion is received within the opening 120, and an upper semi-cylindrical tongue section which includes approximately 180 degrees of the wall of the cylindrical section and is rounded off at the top. The lower cylindrical section has an opening 128 through which the dishes pass onto the belt.

The lower cylindrical section and the tongue section may be replaced by a plurality of rods whose outer surfaces define points along the inner circumference of the sections.

Figure 8:
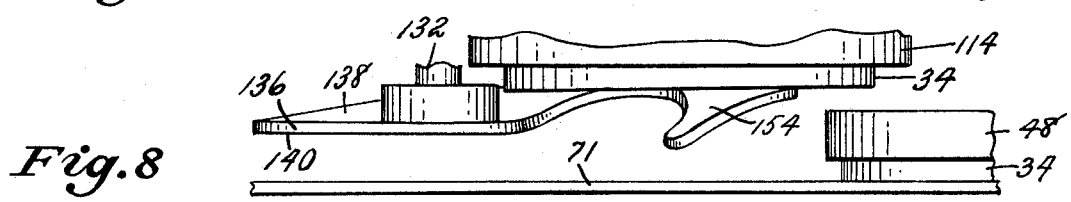
FIG. 8 is a view similar to FIG. 7, the cam having rotated to where the upper portion supports the stack free of the dish on the main conveyance means.

Secured to the outer surface of the lower cylindrical section 122 near the opening 128 is a gear-box 130 containing right angle mitre gears. Passing downwardly from the box, parallel to the magazine and perpendicular to the center of the belt, is a shaft upon which is mounted a stepped, volute cam. The cam may be adjusted vertically along the shaft. As best seen in FIGS. 5 and 7–9, the cam comprises a lower stepped portion 136 having an upper surface 138 and a lower surface 140; an inclined connecting portion 142 having an upper surface 144 and a lower surface 146; and an upper stepped portion 148 having an upper surface 150 and a lower surface 152. The portion 148 has a tip section 154 which points downwardly as best seen in FIG. 8.

The cam 134 is adjustably mounted to the shaft 132 in the lower stepped portion 136 (FIG. 5). Traveling in a direction from the shaft and as shown by the arrow 156 the edge 158 is substantially convex and describes a volute path of constantly increasing diameter until it reaches the edge 160 of the tip section 154. At that point the side 162 describes a substantially concave path until it meets the point where the side starts describing the volute path.

Positioned next above the conveyance means 14 and between the dispensing means 16 and the discharge end of the conveyor, is the cover removal, retaining, and replacement means 18. The means comprises a suction box 164 (FIG. 4) defined by a top wall 166, a left side wall 170, a right side wall 172, and a removable sole plate 174 having a bottom surface 176. The sole plate is removably attached to the box by any convenient means and forms the bottom wall thereof. The sole plate contains a plurality of perforations 178 (FIG. 3) and in particular several large bores 180, several small bores 182, two large bores 184, and a series of small bores 186. The right side wall 172 contains a bore 188 through which passes a suction pipe 190 connected to any convenient vacuum pump such as the Craftsman Home-'N-Shop Vac. manufactured by Sears, Roebuck & Co. A snap switch 192 is mounted on the outer edge of the sole plate for the purpose hereinafter appearing.

Angle irons 194 are mounted on the left and right sidewalls 170, 172 of the suction box 164 and have bores 195 receiving threaded adjustable support posts 196 on which are placed "coned" adjusting nuts 197. The posts are mounted to angle irons 194 by clamps 198.

Mounted on the left end (FIG. 3) of the box 164 is an idler pulley 200 journaled in pillow blocks 202 which are secured to the angle irons 194. In a similar manner driver pulley 204 is journaled within pillow blocks 206 which are similarly mounted on angle irons 194. Passing around the pulleys is a conveyor belt 208 defined by an inner surface 210 and an outer surface 212. The inner surface 210 makes sliding contact with the bottom surface 176 of the sole plate 174. The belt has a series of spaced perforations 214 which are in alignment with the plurality of perforations 178 in the sole plate 174.

The carrying sides of the conveyance means 14 and the belt 208 travel in the same direction or from left to right when viewing FIGS. 1 and 2. However, the principal axes of the two belts are not parallel, but are "yawed" with respect to each other as shown by the schematic arrows representing the principal axes in FIG. 1A. The cover removal, retaining and replacement means is yawed diagonally towards the outer surface of the machine, as best seen in FIG. 1 for the purpose hereinafter appearing.

Positioned between the dispensing means 16 and the cover removal, retaining and replacement means 18 is an alignment guide 216 (FIG. 5) having an upstanding wall 217. The guide is supported by an adjustable support post 218 secured to a clamp 220 mounted on the inner angle iron 74. The guide extends diagonally over the main conveyor belt and serves to position dishes on the belt in alignment with the perforations 214 in the belt 208.

In a similar manner at the other end of the means 18 (FIG. 5), there is positioned a bumper plate 222 supported by an adjustable support post 224 secured in a clamp 226 mounted on the angle iron 74. This plate serves to pivot descending covers onto the corresponding bases in a manner which will be described more fully hereinafter.

Positioned coincident with the means 18 is the independently actuated filling means 20. This means includes a pipetter mechanism 228. Examples of such units are the "Filamatic Filler," made by National Instrument Company of Baltimore, Md., or the number F400–390 made by Cozzoli Machine Company of Plainfield, N.J. The mechanism 228 is secured by means of a tube 230 to fill needle 232. The fill needle is so positioned that it extends over the open base of a dish whose cover is being retained therefrom by the means 18. The needle is maintained by a support 234 which is secured in a universal mounting 236 attached to the angle iron 74.

The pipetter mechanism 228 is actuated by the snap switch 192 as it comes in contact with a cover retained against the belt 208. The snap switch closes a circuit which actuates the mechanism for a single cycle of operation, filling the base of one dish in a manner which will be described more fully hereinafter.

Spaced from the means 18, between said means 18 and the discharge end of the conveyance means 14 is the malfunction rejection means 22.

An opening 238 is located in the deck 62 of the channel 60. The opening is generally rectangular but has rounded ends. Mounted under the deck and on the right inner side wall 66 is a proximity switch 250, which will be described in greater detail hereafter. Positioned within the opening 238 is a sensor plate 242 having basically the same configuration as said opening but smaller dimensions. The upper surface 243 of the plate is flush with the upper surface 64 of the deck 62. Located underneath the sensor plate and abutting the lower surface 65 of the deck 62 is a mounting plate 244 supporting the plate and secured to the deck by any convenient means. Passing through the sensor plate 242 and the mounting plate 244 is a threaded bore 246 in which is secured a recessed flat head screw 248. The screw is electrically connected to a sensor unit 250 which in turn is connected to a control box 252. An example of the units 250, 252 is the Robertshaw proximity switch, serial number P–512, made by Robertshaw Controls Company of Columbus, Ohio. A single pole, double throw relay within the control box is in series with a single pole, double throw snap switch 254 which has a sensing arm 255. The snap switch utilizes its normally open circuit. When the relay and snap switch are both closed a solenoid valve 256 opens. An example of a solenoid valve which may be used with the present invention is serial number VNJ, 100 p.s.i., Skinner Electric Valve. A switch 258 is placed in parallel with the solenoid valve and can override the sensor unit. The switch 258 has a sensing arm 259.

A support rod and clamp 260 is secured to the inner angle iron 74 and carries a collar 262 to which is secured a rod 264 which carries the switches 254, 258, and carries a mounting 266 to which is secured the solenoid valve 256. Extending outwardly from the valve is a nozzle 270, which is positioned just above the deck 62 and at a sufficient height to have its flow stream interrupted by the passage of a dish thereby. The other end of the valve is connected by means of a pipe 272 to a pressurized gas supply 274.

Referring back to FIGS. 1 and 2, there is shown the remaining portion of the frame, or the drive frame, supporting the drive elements of the machine. This portion of the frame is supported by legs (not shown) which may be similar to the jacks 52 supporting the main portion of the frame. The drive frame supports a motor 276 which is secured to a motor mount 278 supported by legs (not shown) and a cross support 280. The motor may be a variable speed DC gearhead motor drive with a variable DC control.

Passing out of the motor is a shaft 282 to which is secured a pulley 284. Passing around the pulley is a drive belt 286 connected to a corresponding drive shaft 287 of a double worm reducer 288. The reducer is secured to mounting rails 290, depending from the cross support 280. Passing outwardly from the reducer is a flexible drive shaft 292 secured to the driver pulley 88 of the conveyance means.

Mounted on the rails 290 on the other side of the reducer 288 from the motor 276, are pillow block bearings 294 in which is journaled a shaft 296, being driven by means of a 1 to 1 chain drive 298 off the shaft 292. The shaft 296 is also mounted to a flexible drive shaft 300 secured to the driver pulley 204 of the means 18.

The shaft 296 also carries a sprocket 304 which is connected by a chain 306 to a sprocket 308 journaled in pillow blocks 310 on mounting rails 290. The sprocket 304 is three times the size of sprocket 308, thus causing a 3 to 1 speed-up of the sprocket 308. Said sprocket is also secured to the flexible dispensing drive shaft 314 which is connected to the right angle miter gear box 130 driving the cam 134.

Figure 10:
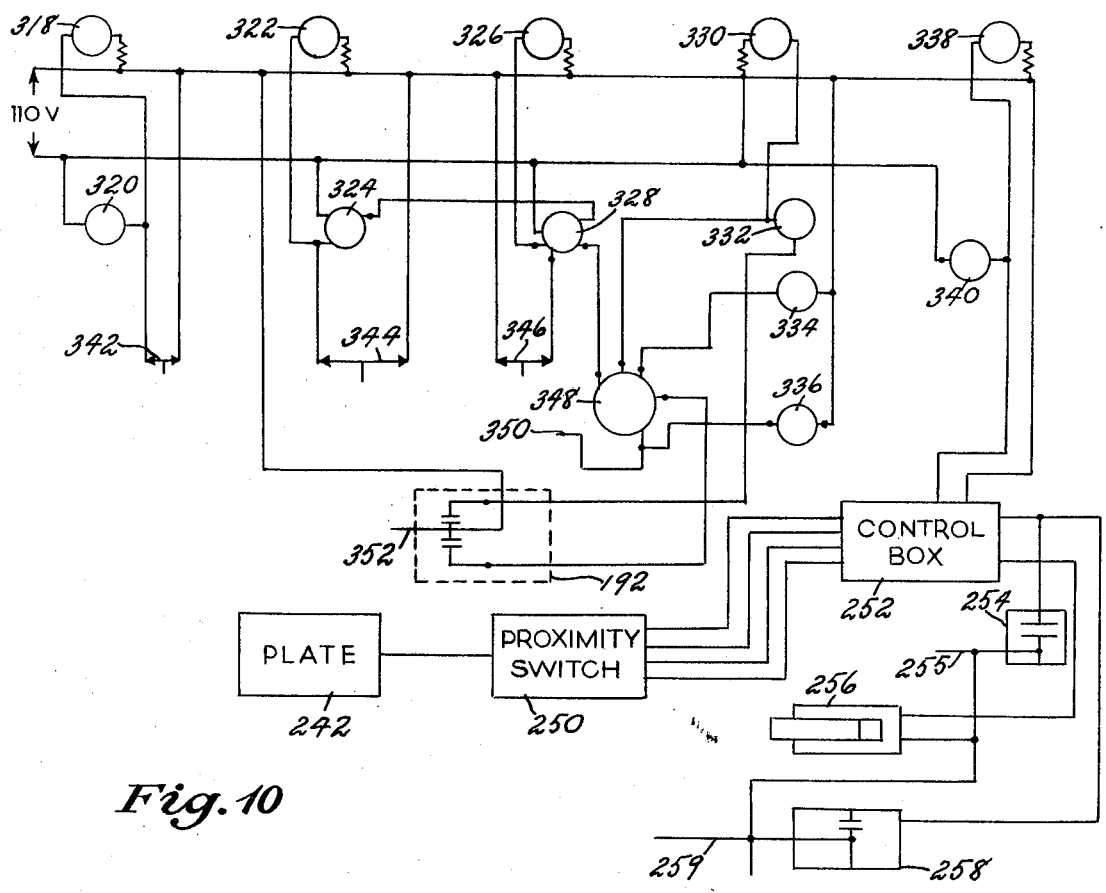
FIG. 10 is a schematic of the electrical circuit of the machine.

Turning to FIG. 10, there is shown a schematic of the electrical circuit of the machine. The control elements of the circuit appear on the panel of the control box 316 (FIG. 2). These elements are: the vacuum circuit bulb 318 and corresponding toggle switch 320; the power drive bulb 322 and corresponding toggle switch 324; the pipetter blub 326 and the corresponding toggle switch 328; the filling cycle bulb 330 and the fill push button 332, the stop push button 334, and the manual switch 336; and the malfunction rejection bulb 338 and corresponding toggle switch 340.

The switch 320 is a single throw and is connected in series with a suction pump plug 342. The switch 324 is a double pole, single throw and is connected in series to a power drive plug 344. The switch 328 is a double pole, single throw and is connected in series to a pipetter plug 346, as well as to switch 324. The switch 328 is also connected to relay 348, which is a double pole, single throw. The relay is also connected to switch 334, which is a normally closed push button. Switch 332 is a normally opened push button and is connected to the normally closed side of the snap switch 192. The snap switch may be a Robertshaw CTRLD–0078 snap switch. The snap switch is also connected to the relay 348. The switch is a normally opened push button and is connected to the single cycle operation line 350, which is also connected to the relay 348.

The malfunction rejection circuit has been described in some detail previously. It consists basically of a capacitance circuit type proximity switch which includes the sensor plate 242, the sensor unit 250, and the control box 252. The proximity switch operates a single pole, double-throw relay. The normally closed side is connected in series with the snap switch 254 and the solenoid valve 256. The switch 254 is in the normally opened position and the solenoid valve is in the normally closed position, thus actuation of the lever 255 closing the snap switch 254 will not complete the circuit to the solenoid valve, unless the normally closed circuit of relay in the capacitance circuit is closed. The snap switch 258 is connected in parallel with the control box and may override the sensor unit 250 as hereinafeer described. The switch 258 is a normally opened switch and when closed actuates the solenoid valve 256 to which it is connected.

Installation and set up of the machine is very easily accomplished. The various sections of the channel bed 60 are secured together by means of the angle irons 74 in any convenient manner and then raised so that the deck 62 of the bed is in a common plane. This is accomplished by means of the adjustable leveling jacks 52 secured to the bars 59 passing through the openings 72.

In a similar manner, the dispensing means 16, the cover removal, retaining, and replacement means 18, the independently actuated filling means 20, and the malfunction rejection means 22 are secured by their support posts and clamps in proper position along the conveyance means 14, as shown in FIGS. 1 and 2, and the fill needle and pipetter mechanism are adjusted. The drive frame is then assembled with the motor and the shaft 292, 300, 314, secured to their respective positions. The electrical connections are completed and the belt 68 is placed in position after having been autoclaved. The carrying side of the belt rests upon the deck 62, passing around tail end head idler pulleys 76 and 80, under tension pulley 84 and over driver pulley 88, and then under pulley 100 and over pulleys 110 and 111. The take-up bearing 98 is then slid into position on the struts 96, the desired tension being applied to the belt by rotational adjustment of the take-up nut 104, which varies the vertical position of the take-up bolt 102 and consequently the bearing 98. The machine is now ready to be placed into operation.

A supply of Petri dishes 24 which had been hermetically sealed within a cylindrical plastic bag are placed in position within the magazine 114 as shown in FIG. 2. The bag fits over the semi-cylindrical tongue section 126 and the dishes fall down within the lower cylindrical section 122 to the opening 120 where they are supported by the cam 134 which has been placed in a position to support the dishes.

It should be noted that instead of using the semi-cylindrical tongue 126 it would be possible to replace this part with a plurality of upstanding rods along the arcuate section of the circumference thereof. The rods serve the same position of maintaining the dishes in proper aligned relationship within the magazine, and provide easier access to the magazine structure during the dispensing of dishes therefrom.

Next the control box 316 switches are activated. The toggle switch 320 is closed, activating the suction pump and creating a minus atmospheric pressure within the suction box 164. Then the toggle switch 324 is closed powering the motor 276, and consequently driving the belt 68 of the conveyance means, the belt 208 of the cover removal, retaining and replacement means, and the stepped volute cam 134. The toggle switch 328 is then closed, activating the pipetter mechanism to which has been attached a charge of sterile liquid media. Finally the toggle switch 340 is closed, actuating the malfunction rejection means.

Figure 9:
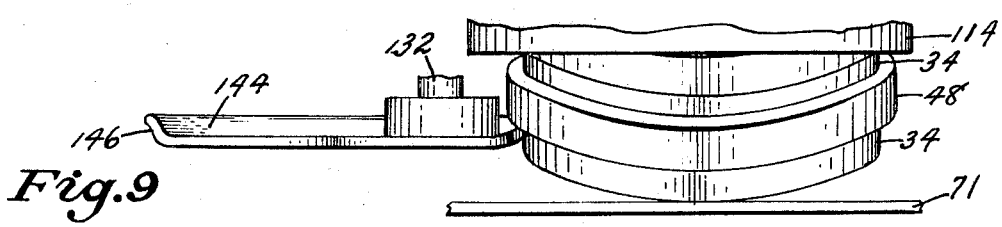
FIG. 9 is a view similar to FIG. 7, the cam having been rotated to where the next succeeding dish in the stack has engaged the tip section and has started to drop to the conveyance means.

At this point, dishes from the magazine will commence being metered onto the belt 68 of the conveyance means 14. Referring to FIG. 9 there is shown a Petri dish with its lower surface 30 in abutment with the upper surface 150 of the upper stepped portion 158 and in particular the tip section 154 thereof, which is allowing the dish to drop from the stack within the magazine onto the upper surface 69 of the belt. FIG. 7 shows the dish on the belt moving out from under the opening 120 of the magazine, the stack of dishes now being supported by the upper surface 138 of the lower stepped portion 136. The stack is also being partially supported by the upper surface 42 of the cover 38 of the dish on the belt. It is necessary to raise the stack of dishes off the dish on the belt, or the next succeeding dish will tend to drop slightly forward and apply a force to the dish on the belt causing it to jump forward on the belt. Accordingly, the stacked dishes next contact the inclined connection portion 142 of the cam and are raised to the upper stepped portion 148 (FIG. 8) thus providing sufficient clearance for the dish on the belt. The volute edge 158, especially along the lower stepped portion 136, may at times contact the outer surface 48 of the sidewall 46, imparting an initial forward linear motion to assist in moving the dish out from under the magazine opening. Since the cam is adjustable vertically along the shaft 132 the proper clearances may be obtained. In the present embodiment of the invention the belt 68 of the conveyance means moves approximately 12 inches during which time the cam 134 is rotated 3 full revolutions because of the relationship between sprocket 304 and sprocket 308. Thus, three dishes will be placed upon the belt during each foot of movement of the belt under the dispensing means.

The dispensing means provides an unusually simple means of placing the dishes on the belt, as well as metering the rate of the placement of dishes upon the belt, imparting an initial linear motion to each dish where necessary, and supporting the weight of the succeeding stack of dishes in the magazine off the dish on the belt as it moves from under the magazine opening. The ability to perform all these necessary functions in this simplified embodiment is due to the novel design of the stepped, volute cam 134. The lower stepped portion has a standard volute edge which passes through the connecting portion and the upper stepped portion, and terminates in the tip section. The length of the upper stepped portion 148 determines the support time of the dishes.

The dishes do not always drop directly under the magazine and may at various times be pushed out of general desired alignment. Accordingly, an alignment guide 216 is positioned to contact the outer surface 48 of the sidewall 46, repositioning the dish on the belt (FIG. 5) for engagement by the means 18.

The dish is then moved under the perforations 214 in the belt 208 of the cover removal, retaining and replacement means. As the perforations 214 align with the first two large bores 180 of the plurality of perforations 178 in the sole plate 174 of the suction box 164, a strong minus atmosphere is created within the proximate vicinity of the cover 38 of the dish, drawing the cover off the base and into an abutting relationship with the outer surface 212 of the belt 208.

During the removal operation, the inner surface 50 of the sidewall 46 presses against the outer surface 34 of the sidewall 32 of the base 24, causing it to move in a lateral direction, and out of registry or alignment with the cover. Accordingly, the means 18 is yawed, as mentioned previously, so that during the forward travel of the cover while it is retained against the belt 208, it will gradually be moved back into registry with the base.

It is at this point that the fill button 332 is depressed, completing the circuit from the normally closed side of the snap switch 192 to the relay 348, closing it. This also completes the circuit to bulb 330 which lights and remains lit as long as relay 348 remains closed. Because of the position of the switch on the sole plate 174, as the side of the cover contacts the lever 352 it will close the normally opened side of the snap switch, and actuate the filling cycle 350 for a single cycle of operation. Media is then discharged from the pipetter mechanism 228 through the tube 230 and fill needle 232 into the base of the opened dish.

With the closure of relay 348, it is no longer necessary to keep the fill button 332 depressed. The only open part of the circuit is now the normally opened side of the snap switch 192 which is closed every time lever 352 contacts the sidewall 46 of a cover 38 of the dish. Closure of the circuit actuates the filling operation for a single cycle. This is very important since it allows the whole filling operation to be commenced by the physical presence of an opened Petri dish. This allows independent actuation of the filling cycle. The present invention does not required a precisely prepositioned unit as it is dispened through the conveyance means of the machine. This is a decided and important advantage over all prior filling machines and is one of the significant contributing factors to the simplicity of the present machine. The coordination of the pipletter mechanism, the speed of the belt of the main conveyance means the speed of the belt of the cover removal, retaining and replacement means, are arranged so that filling of the base occurs only when the fill needle is directly over the base. Thus, the only crucial spacial relationship as regards to filling operation, occurs when the cover makes contact with the snap switch 192, and not before.

Should it be desired to stop the filling operation, the stop button 334 is depressed breaking the circuit to the relay 348 and opening the contacts therein.

Depressing the button 336 will close a circuit which is parallel to the relay 348 and cause manual operation of the single cycle filling 350. Of course, it is understood that the pipetter mechanism circuit must be closed as well. This will also break the circuit to bulb 330, causing it to extinguish.

During the filling operation, the cover is moving under two large bores 194 in the sole plate 174. This insures that there will be a large area to which the suction is applied, diminishing the chances that the cover will be released from its retained position.

The cover passes under a series of small holes 186 in the sole plate 174, and then at the end of the suction box there is no longer any force maintaining the cover in abutment against the belt and it begins to fall towards the base. The holes 186 are small in order to insure that there is a limited surface of suction being applied to the cover. If the holes were large, as the cover was released from the belt it would tend to turn on a radius and pivot out of position with the base.

Turning to FIG. 4 there is shown a cover just prior to release. The sidewall 46 of the cover 38 overlaps the sidewall 32 of the base 24. As the cover is released (FIG. 4A) it moves downwardly and rearwardly where the outer surface 48 of the sidewall 46 contacts the bumper plate 222. It pivots off the plate and onto the base, as shown in FIGS. 5 and 4A. During the entire travel of the cover and base along the length of the cover removal, retaining, and replacement means, the cover has gradually been moved back into alignment with the base due to the yawed positioning of the means 18 (FIGS. 1 and 1A). Because the sidewalls of the base and cover overlap (FIG. 4), should the non-alignment be just slight, the cover will continually nudge the base outwardly during the longitudinal travel, thus continually maintaining the two parts in registry.

Once the cover has been reunited with the base (FIG. 6) it continues travelling down the belt of the main conveyance means 14. As previously stated, a portion of the conveyance means has been broken away (FIGS. 1 and 2), because of its substantial length. During the time the dishes are travelling on the conveyance means, the media within the base is cooling and congealing, forming a jelled agar.

Proximate to the discharge end of the conveyance means is the malfunction rejection means. The media in the dishes has jelled by the time they reach the malfunction rejection means. The dish is tested for two conditions.

The first condition is whether or not the media has filled the base. The relay in the sensor unit 250 is activated by a capacitance circuit which is connected to the plate 242. When an empty dish or fairly empty dish passes over the plate the dielectric characteristics will remain constant and the relay connected to the plate will stay in a normally closed position. As the plate passes under the switch 254, the lever 255 contacts the cover and moves the switch, which is in the normally opened position to a closed position. The switch 254, which in turn is connected to the solenoid valve 256 which is in the normally closed position completes the circuit to the control box which is in turn connected to the power source to the closed switch 340, and the solenoid valve opens. This allows gas from the pressurized gas supply 274 to flow out through the nozzle 270, blowing the dish off the conveyance means and into a disposal area. If a filled dish goes over the plate the dielectric of the capacitance circuit increases and the relay in box 252 opens. Thus the closing of the switch 254 will still leave an uncompleted circuit and the solenoid valve will not be activated.

The means 22 also detects whether or not the cover has been replaced properly upon the base. If the cover is askew it will contact lever 259 causing the normally opened switch 258 to close. Since this switch is in parallel with the proximity circuit it overrides it, and thus it is immaterial whether a filled or an empty dish has passed over the plate 242. When the switch 258 is closed the circuit to the solenoid valve is completed and once again the valve opens and allows gas to escape, blowing the dish in question off the conveyance means and into a disposal area.

It is not necessary that the malfunction rejection means be activated in order for the rest of the machine to be operated. However, it is necessary that the other elements be operating to insure proper performance of the machine.

There are three ways to stop and restart the machine. By pushing the fill stop button 332, the relay 348 will open, allowing an already started filling cycle to be completed, but no further cycling will occur. The conveyor will continue running. To restart, it is necessary to depress the button 332 until the bulb 330 relights.

The second way to stop the machine is to open the pipetter toggle switch 328. This will stop the fill cycle instantaneously and also open the relay 348, but it will not stop the conveyor. To restart, the conveyor must be stopped and the bottom of a dish moved under the fill needle. The pipetter mechanism is then restarted, and the fill cycle is allowed to be completed. The conveyor is then restarted and the fill button is depressed until the bulb 330 relights.

The third way to stop the machine is to open the conveyor toggle switch 324. An already started fill cycle will go to completion, and relay 348 will reopen. This may cause the pipetter to discharge before a dish reaches the fill needle. Restarting the machine is done in the normal manner.

Thus, there is provided an automatic dish filling machine which completely and properly performs all the desired functions and yet is unusually simply to assemble, operate, maintain, and dismantle. All major elements of the machine are adjustable upon the frame to insure proper operation thereof. The automatic operation of the machine is so complete that it may be run continuously without the presence of a human operator, thus insuring an unusual degree of hitherto unobtainable sterility during the necessary operations.

While preferred embodiments of the invention have been shown and described herein, it is obvious that numerous omissions, changes and additions may be made in such embodiments without departing from the spirit and scope of the invention.

I claim:
1. In combination, a machine for automatically filling a dish having a cover and a base, the machine comprising:
 (a) conveyance means having a supply end and a discharge end;
 (b) dispensing means located over the conveyance means adjacent the supply end thereof, metering dishes onto the conveyance means;
 (c) means located over the conveyance means, between the discharge end thereof and the dispensing means, to remove the covers from the bases of the dishes, retain the cover in the removed position while the bases are being filled, and replace the covers on the bases after filling has been completed, and
 (d) means for filling the bases of the dishes, including a switch mounted on the cover removal, retaining, and replacement means to contact the covers after they are removed, the switch actuating a single filling cycle to fill a single base.

2. The invention according to claim 1, including malfunction rejection means secured to the main conveyance means, between the discharge end thereof and the cover removal, retaining and replacement means, having means to determine if the base has been filled and means to determine if the cover has been properly replaced on the base.

3. A machine for automatically filling a two part dish including a base and a cover, comprising:
 (a) a frame;
 (b) conveyance means secured to the frame;
 (c) dispensing means for the dishes secured to the frame located adjacent and over the main conveyance means, and including a magazine and a stepped cam to meter the flow of dishes from the magazine onto the main conveyance means, maintain the succeeding dishes in raised position to enable free travel of the dish just dropped on the main conveyance means, and impart a linear forward motion to the dish just dropped to insure that it will not obstruct the succeeding dish to be dropped;
 (d) cover removal, retaining, and replacement means secured to the frame and angularly opposed and yawed with respect to the conveyance means, the second means having means to remove the covers from the bases of the dishes as they pass under the second means, retain them off the bases, and return them to the bases after a predetermined travel, and
 (e) filling means having a switch proximate to the cover removal, retaining and replacement means which when actuated by the presence of a cover, cycles the filling mechanism to place a predetermined quantity of media in the base of the dish, the cycling occurring independently of the prior positions of the dishes on the conveyance means before reaching the cover removal, retaining, and replacement means.

4. The invention according to claim 3, including malfunction rejection means, secured to the frame and located proximate the conveyance means after the cam means, including sensing means to determine if the dish has been filled with the proper amount of media and cover location sensing means to determine if the cover has been properly replaced on the base.

5. The invention according to claim 3, the conveyance means, the dispensing means, and the cam means being driven by a commonly interlocked power drive.

6. The invention according to claim 4, the cam comprising a lower stepped portion, an inclined connection portion, and an upper stepped portion.

7. The invention according to claim 6, the lower stepped portion defined by an upper support surface, a lower surface, and an edge having a substantially convex configuration, the upper surface supporting a stack of dishes in the magazine, and the edge imparting an initial linear motion, where necessary, to the dish just dropped on the conveyance means, assuring clearance of the dispensing area prior to the metering of the succeeding dish on the conveyance means.

8. The invention according to claim 6, the upper portion including a substantially level support section and terminating in a downwardly curved tip section, the portion defined by an upper support surface, an arcuate convex volute edge, and an arcuate concave edge, the level support section of the upper portion supporting the stack of dishes at a sufficient clearance level while the dish just dropped moves out from under the magazine, and the tip section allowing the succeeding dish to be inclined down to the conveyance means.

9. The invention according to claim 6, the connecting portion being inclined and having an upper surface on which the stack of dishes is lifted up to the upper support surface of the upper portion.

10. The invention according to claim 7, the upper portion including a substantially level support section and terminating in a downwardly curved tip section, the portion defined by an upper support surface, an arcuate convex volute edge, and an arcuate concave edge, the level support section of the upper portion supporting the stack of dishes at a sufficient clearance level while the dish just dropped moves out from under the magazine, and the tip section allowing the succeeding dish to be inclined down to the conveyance means.

11. The invention according to claim 10, the connecting portion being inclined and having an upper surface on which the stack of dishes is lifted up to the upper support surface of the upper portion.

12. The invention according to claim 4, the cover removal, retaining and replacement means including a conveyor belt having spaced perforations thereon, a suction box having a bottom wall, the bottom wall abutting the inner surface of the belt, the bottom wall having perforations aligned with the perforations in the belt so as to maintain the atmosphere proximate to the belt perforations at a minus atmospheric pressure.

13. The invention according to claim 12, a bumper plate positioned between the conveyance means and the cover removal, retaining, and replacement means near the end of the second means, the cam in the line of fall of the covers as they are released from the suction, the falling covers striking the cam and being pivotally urged into an alignment fit with the base.

14. The invention according to claim 12, the perforations in the wall of the suction box being larger at the near end and the middle to insure that the cover is lifted off the base and maintained against the second means during the introduction of media into the base, and the perforations being smaller at the end of the suction box to allow the cover to be released evenly from the second means.

15. The invention according to claim 12, an alignment guide placed above the conveyance means, prior to the cover removal, retaining and replacement means a distance above the conveyance means sufficient to allow engagement with the side walls of the dishes, the guide positioning the dishes on the conveyance means in alignment with the perforations in the conveyor belt for optimum removal of the covers.

16. The invention according to claim 4, the first conveyance means including a conveyor belt composed of autoclavable nylon.

17. The invention according to claim 16, the belt being of sufficient length to allow congealment of the media prior to removal from the belt.

18. The method of filling a two part dish including a base and cover, the steps comprising:
 (a) dispensing individual closed dishes onto a moving conveyor at a specified rate without regard to the displacement between each dish, and while each dish is being moved by said conveyor;
 (b) removing the cover from the base,
 (c) sensing the presence of the cover,
 (d) filling the base in response to the sensing of the cover, and
 (e) replacing the cover on the base.

19. The invention according to claim 18, moving the cover back into registry with the base prior to its replacement.

20. The invention according to claim 18, discarding the dish if it is not properly filled.

21. The invention according to claim 18, discarding the dish if the cover has not been properly replaced on the base.

References Cited

UNITED STATES PATENTS

| | | | |
|---|---|---|---|
| 2,379,090 | 6/1945 | Le Beau | 53—382 |
| 2,931,147 | 4/1960 | Barnby. | |
| 3,022,912 | 2/1962 | Vincent. | |
| 3,050,915 | 8/1962 | Silverstolpe | 53—381 X |

THERON E. CONDON, Primary Examiner

R. L. SPRUILL, Assistant Examiner

U.S. Cl. X.R.

53—53, 59, 109, 167, 282, 381